United States Patent [19]

Lucas et al.

[11] Patent Number: 5,340,620
[45] Date of Patent: Aug. 23, 1994

[54] PROCESS FOR PRODUCING AN IMPROVED OXYGEN BARRIER STRUCTURE ON PAPER

[75] Inventors: Paul C. Lucas, Chester, N.Y.; Guy D'Anna, Ridgefield, N.J.; Ronald J. Messenger, Matamoras, Pa.

[73] Assignee: International Paper Company, Tuxedo Park, N.Y.

[21] Appl. No.: 120,143

[22] Filed: Sep. 13, 1993

[51] Int. Cl.$^5$ ............................................. B05D 3/06
[52] U.S. Cl. .................................... 427/515; 427/517; 427/519; 427/387; 427/411; 522/84; 522/99
[58] Field of Search .............. 427/515, 517, 519, 411, 427/387, 553; 428/447, 452; 522/99, 84

[56] References Cited

U.S. PATENT DOCUMENTS

| | | | |
|---|---|---|---|
| 3,169,246 | 11/1971 | Bragole | 117/47 A |
| 3,726,710 | 4/1973 | Berger et al. | 117/93.31 |
| 3,852,097 | 12/1974 | Owen et al. | 117/93.31 |
| 3,989,609 | 11/1976 | Brack | 204/159.15 |
| 4,138,508 | 2/1979 | Spatz et al. | 427/151 |
| 4,186,115 | 1/1980 | Spatz et al. | 260/22 R |
| 4,218,294 | 8/1980 | Brack | 204/159.13 |
| 4,288,479 | 9/1981 | Brack | 428/40 |
| 4,303,696 | 12/1981 | Brack | 427/44 |
| 4,348,462 | 9/1982 | Chung | 428/412 |
| 4,586,996 | 5/1986 | Shinohara et al. | 522/7 |
| 4,587,136 | 5/1986 | White et al. | 427/54.1 |
| 4,606,933 | 8/1986 | Griswold et al. | 428/447 |
| 4,780,486 | 10/1988 | Lee et al. | 522/14 |
| 4,803,126 | 2/1989 | Wyman | 428/447 |
| 4,810,731 | 3/1989 | Hida et al. | 522/33 |
| 4,822,828 | 4/1989 | Swofford | 522/84 |
| 4,911,864 | 3/1990 | Sato et al. | 252/518 |
| 4,923,754 | 5/1990 | Lee et al. | 428/429 |
| 4,946,874 | 8/1990 | Lee et al. | 522/99 |
| 4,977,033 | 12/1990 | Akao | 428/316 |
| 5,009,924 | 4/1991 | Wyman | 427/44 |
| 5,019,644 | 5/1991 | Cavezzan et al. | 428/447 |
| 5,026,813 | 6/1991 | Meder | 528/18 |
| 5,077,135 | 12/1991 | Wyman | 428/447 |
| 5,096,738 | 3/1992 | Wyman | 427/44 |
| 5,142,212 | 6/1992 | Lee et al. | 428/429 |
| 5,153,039 | 10/1992 | Porter et al. | 428/36.92 |

FOREIGN PATENT DOCUMENTS 274428 7/1988 European Pat. Off. .

*Primary Examiner*—Shrive Beck
*Assistant Examiner*—Erma Cameron
*Attorney, Agent, or Firm*—Hoffman, Wasson & Gitler

[57] ABSTRACT

The invention provides a process for producing an improved barrier laminate structure composed of an oxygen barrier silicone coating on a paper or paperboard substrate. The process comprises hydrolyzing a silane formulation with water to form a corresponding silanol. A photoinitiator is added to the silanol to form an ultraviolet sensitive formulation. The formulation is coated onto a paper or paperboard substrate and allowed to dry. Once dryed, the formulation is exposed to ultraviolet radiation to form a cured formulation.

7 Claims, No Drawings

PROCESS FOR PRODUCING AN IMPROVED OXYGEN BARRIER STRUCTURE ON PAPER

The invention relates to the use of organofunctional silanes to produce barrier coating formulations with low oxygen permeability. The formulations are cured through the use of ultraviolet radiation after application to a paper or paperboard substrate.

BACKGROUND OF THE INVENTION

Silanes have been grafted to a polymer film to form an oxygen barrier coating through the use of electron beam processing.

U.S. Pat. Nos. 4,803,126 and 5,009,924, specify the need for electron beam irradiation in order to form the silane barrier layer or the film. Since electron beam processing discolors and embrittles paperboard, it is desirable to utilize another method for producing the materials on polymer coated paper or paperboard.

Electron beam irradiation tends to penetrate well beyond the coating into the paper or paperboard embrittlement and discoloration can occur throughout a substrate to the uncoated side.

Previous approaches, prior to electron beam irradiation, to improving barrier properties of, for example polyolefin films, have involved the application of a second polymer layer to the base film, often by extrusion, in which the second polymer layer has substantially superior barrier properties against permeation oxygen. Examples of these materials are polyvinylidene chloride, ethylene vinyl alcohol copolymer, and the like.

The additional expense involved in the use of an additional layer and the difficulty found in adhering the second polymers to the polyolefin film makes this approach somewhat undesirable.

Silane materials have heretofore been used to modify the surface of polymers to improve adhesion. A variety of organofunctional silanes are useful as coupling agents. Glass fiber polymer laminates have been substantially improved by the use of certain silane coatings on the glass fibers which will graft and bond strongly to specific polymers that otherwise do not wet the glass surface well.

Certain organofunctional silane coupling agents will promote adhesion between dissimilar polymers which are otherwise difficult to bond. Bonding of polyethylene to polyester using a hot melt adhesive following the application of the proper coupling agent to each polymer surface is accomplished.

As mentioned already, electron beam irradiation can discolor paperboard/paper, causing a bleached substrate to turn yellow. This result has a negative influence on product appearance and graphic arts quality. Electron beam irradiation can also embrittle paper/paperboard, leading to scoreline cracking or other converting runnability problems. Since the electron beam tends to penetrate well beyond the coating into the paper, embrittlement and discoloration can occur throughout a paper substrate to the uncoated side. Additionally, there has been the need for grafting the silane to a polymer substrate, which limits package construction options.

The present invention utilizes ultraviolet radiation to cure a silane coating and form a barrier to oxygen permeation. The ultraviolet radiation is absorbed almost completely in the coating layer and that portion which reaches the paper has little effect on its strength and cannot discolor the uncoated side of even a thin paper substrate. Further, one can use paper substrates which do not have extrusion coated polymer layers on the surface, thereby increasing the number of construction options.

SUMMARY OF THE INVENTION

The invention provides a process for producing an improved oxygen barrier structure including an ultraviolet cured coating on a paper or paperboard substrate. The process comprises hydrolyzing a silane formulation with water to form a corresponding silanol. A photoinitiator, such as 1-benzoylcyclohexanol, is added to the silanol to form an ultraviolet sensitive formulation. The formulation is coated onto a paper or paperboard substrate and allowed to dry. Once dryed, the formulation is exposed to ultraviolet radiation to form a cured formulation. The cured formulation exhibits oxygen barrier properties (permeability) in the range of commercially available materials such as polyvinylidene chloride, ethylene vinyl alcohol copolymer or polyethylene terephthalate.

DETAILED DESCRIPTION OF THE INVENTION

The invention relates to the use of ultraviolet cured hydrolyzed organofunctional silanes as oxygen barrier coating layers for paperboard or paper substrates. The coatings are uniquely cured with ultraviolet radiation, and, as such, more manufacturing options are employable.

Commercially available organofunctional silanes are prepared for use as coating materials. The silanes are selected for their ability to polymerize when exposed to ultraviolet light. The polymerization may be initiated by either direct photolysis of the silanol or by reaction with a photoinitiator or its fragments.

Typical functional groups on the silane which undergo polymerization include carbon-carbon double bonds, epoxides, etc. The silane may be of the methoxy, acetoxy or alkoxy type which can be hydrolyzed. Further, the silane may be formulated in a prehydrolyzed form in solution, or it may be in a prehydrolyzed pure silanol form. By way of example, but not limitation, suitable silanes include 3-methacryloloxypropyltrimethoxy silane, 3-glycidoxypropyltrimethoxy silane, N-(2-(vinylbenzylamino) -ethyl)-3-aminopropyltrimethoxy silane and vinyltrimethoxysilane. Blends of these silanes and others may be used.

The silane is hydrolyzed to form the corresponding silanol. The hydrolysis typically occurs in an acidic environment through the use of acids such as hydrochloric acid or acetic acid. The amount of water present should be sufficient to fully hydrolyze the silane. A preferred formulation includes from 2 to 10 and preferably three moles of water per mole of silane for most commercially available silanes. A greater amount of water can be used, although it would slow the drying process. Also, as discussed, a prehydrolyzed pure silanol can be used so that no water is added and no drying is required.

After formation of the hydrolyzed silanol, a photoinitiator is added. Suitable photoinitiators such as 1-benzoylcyclohexanol or 4-(2-hydroxyethoxy)phenyl-(2-propyl)ketone can be used. Any photoinitiator which is soluble in the silane can be used and these compounds are listed by way of example, but not limitation. The photoinitiator is present in the range of 0.01 to 0.1 moles per mole of silane, with 0.05 being a preferred amount. The usable concentration range for the photoinitiator is dependent on the quantum efficiency of the photoinitiator, the photoinitiator ultraviolet absorption spectrum, silane reactivity and process variables such as the spectral energy distribution of the lamp, line speed and atmospheric inerting. For silanes that undergo autophotolysis, no photoinitiator is required.

The formulation of hydrolyzed silanol and photoinitiator is then coated onto a substrate. Other materials may be added to the formulation such as thickeners to control penetration of the coating into clay coated or uncoated paper/paperboard, or to control application rheology. Materials that serve as viscosity modifiers or for control of penetration may include inorganic or organic fillers/pigments, or polymers. These materials are selected for their ability to contribute to barrier properties to the coating.

Appropriate substrates to be coated include extrusion coated bleached paper/paperboard, varnished paper/paperboard, clay coated or uncoated paperboard. Additionally, a polymer substrate could be employed, if desired. Barrier performance, may be even further enhanced when the coating is applied to a smooth, relatively non-porous surface due to the resulting coating uniformity.

The coating is then dried to evaporate the solvent, and irradiated with ultraviolet light to cure the silane.

Ultraviolet exposures can be conducted under various systems such as those using medium pressure mercury arc lamps having wattages of 200 watts/inch and 400 watts/inch are used. Samples are passed under the lamps at rates of up to 100 ft/min or more.

Finally, a top coat such as a polyolefin polymer can be provided over the silane coating to protect it from degradation by processes such as abrasion or atmospheric moisture, or to serve as a functional barrier or heat-sealable layer over the silane.

The following examples illustrate the improved barrier properties imparted to a substrate when coated with a cured hydrolyzed silane formulation. Oxygen transmission rates (OTR) were measured for the substrate coated with the formulation. The permeability of the silane formulation coating itself was then calculated from this measurement subtracting out the substrate control.

A coating barrier resulted with permeabilities equal to or better than those used in commercial structures. Some examples of commercially available barriers are polyvinylidene chloride (PVDC) which has a permeability of 1.84 $cm^3 \cdot mil/m^2 \cdot day \cdot atm$, ethylene vinyl alcohol copolymer (EVOH) which has a permeability of 1.0 $cm^3 \cdot mil/m^2 \cdot day \cdot atm$, and polyethylene terephthalate which has a permeability of 63–65 $cm^3 \cdot mil/m^2 \cdot day \cdot atm$. The unique cured coating of the invention certainly falls within this grouping and approaches the preferred materials (PVDC and EVOH).

EXAMPLE 1

Silane: N-(-2-(vinylbenzylamino)-ethyl-3-aminopropyl trimethyoxysilane (Dow Corning z-6032)

Silane was hydrolyzed with water and hydrochloric acid (pH=4)

Coating Thickness: 0.3 mil dry

Photoinitiator: 1-benzoylcyclohexanol

Substrate: 200 lb/3000 $sq^2$ extrusion coated paperboard

| | Oxygen Transmission Rate, $\frac{cm^3}{m^2 \cdot day}$ | | Silane Permeability, $\frac{cm^3 \cdot mil}{m^2 \cdot day \cdot atm}$ | |
|---|---|---|---|---|
| | 75° F., 0% RH | 75° F., 100% RH | 75° F., 0% RH | 75° F., 100% RH |
| Control | 373 | 339 | — | — |
| 200 w/inch | 52 | 122 | 16.6 | 36.6 |
| 800 w/inch | 16.4 | 53.3 | 4.9 | 15.6 |

EXAMPLE 2

Silane: N-(-2-(vinylbenzylamino)-ethyl-3-aminopropyl trimethyoxysilane (Dow Corning z-6032)

Silane was hydrolyzed with water and acetic acid (pH=4)

Coating Thickness: 0.19 mil dry

Photoinitiator: 1-benzoylcyclohexanol

Substrate: 200 lb/3000 $sq^2$ extrusion coated paperboard

| | Oxygen Transmission Rate, $\frac{cm^3}{m^2 \cdot day}$ | | Silane Permeability, $\frac{cm^3 \cdot mil}{m^2 \cdot day \cdot atm}$ | |
|---|---|---|---|---|
| | 75° F., 0% RH | 75° F., 100% RH | 75° F., 0% RH | 75° F., 100% RH |
| Control | 373 | 339 | — | — |
| 200 w/inch | 32 | 102 | 6.1 | 19.4 |
| 800 w/inch | 13 | 49 | 2.5 | 9.3 |

What is claimed is:

1. A process for producing a paper or paperboard laminate with oxygen barrier properties comprising:
    (a) hydrolyzing a silane formulation with water to form a corresponding silanol;
    (b) adding a photoinitiator to said silanol to form an ultraviolet sensitive formulation;
    (c) coating said ultraviolet sensitive formulation onto a paper or paperboard substrate;
    (d) drying said formulation; and
    (e) exposing said formulation to ultraviolet radiation to cure said formulation.

2. A process in accordance with claim 1, further comprising:
    (f) coating an additional polymer material over said cured formulation.

3. A process in accordance with claim 2, wherein said additional polymer material is a polyolefin polymer.

4. A process in accordance with claim 1, wherein said silane formulation can be selected from the group consisting of 3-methacryloloxypropyltrimethoxy silane, 3-glycidoxypropyltrimethoxy silane, N-(2-(vinyl benzylamino)-ethyl)-3-aminopropyltrimethoxy silane, vinyltrimethoxysilane and blends thereof.

5. A process in accordance with claim 1, wherein said photoinitiator is 1-benzoylcyclohexanol or 4-(2-hydroxyethoxy)phenyl-(2-propyl)ketone.

6. A process in accordance with claim 1, wherein said process includes 1 mole of said silane, from 2 to 10 moles of said water, and from 0.01 to 0.1 moles of said photoinitiator.

7. A process in accordance with claim 1, wherein said substrate is selected from the group consisting of extrusion coated paper, extrusion coated paperboard, varnished paper, varnished paperboard, clay coated paper, clay coated paperboard, uncoated paper and uncoated paperboard.

* * * * *